US012073708B2

(12) United States Patent
Wesley et al.

(10) Patent No.: US 12,073,708 B2
(45) Date of Patent: Aug. 27, 2024

(54) EMERGENCY RESPONSE AND CRIME-REDUCING LIGHTING SYSTEM

(71) Applicant: Residential Community Alert Mounted Strobe LLC, Austin, TX (US)

(72) Inventors: Renetta Latrece Wesley, Cedar Hill, TX (US); Dante Wesley, Cedar Hill, TX (US)

( * ) Notice: Subject to any disclaimer, the term of this patent is extended or adjusted under 35 U.S.C. 154(b) by 0 days.

(21) Appl. No.: 18/114,842

(22) Filed: Feb. 27, 2023

(65) Prior Publication Data

US 2023/0206733 A1 Jun. 29, 2023

Related U.S. Application Data

(63) Continuation of application No. 17/721,523, filed on Apr. 15, 2022, now Pat. No. 11,594,112, which is a continuation-in-part of application No. 17/003,763, filed on Aug. 26, 2020, now Pat. No. 11,306,889.

(60) Provisional application No. 62/963,358, filed on Jan. 20, 2020.

(51) Int. Cl.

| | |
|---|---|
| ***G08B 5/00*** | (2006.01) |
| ***F21V 23/04*** | (2006.01) |
| ***F21V 33/00*** | (2006.01) |
| ***F21Y 115/10*** | (2016.01) |
| ***G08B 5/38*** | (2006.01) |
| ***H05B 47/19*** | (2020.01) |

(52) U.S. Cl.
CPC .......... *G08B 5/002* (2013.01); *F21V 23/0435* (2013.01); *F21V 33/0076* (2013.01); *G08B 5/38* (2013.01); *H05B 47/19* (2020.01); *F21Y 2115/10* (2016.08)

(58) Field of Classification Search
CPC ...... F21S 9/022–024; F21S 10/06–066; F21V 33/0064; F21V 33/0076; G08B 5/36–38
See application file for complete search history.

(56) References Cited

U.S. PATENT DOCUMENTS

2018/0259171 A1* 9/2018 Pharr .................. F21V 23/0435
2021/0097846 A1* 4/2021 Rich .................. A61B 5/02055

* cited by examiner

*Primary Examiner* — Mariceli Santiago
(74) *Attorney, Agent, or Firm* — Kirby Drake

(57) ABSTRACT

A lighting assembly is configured to create an emergency notification. The lighting assembly has a housing with a housing first surface and a housing second surface. A plurality of strobe lights and/or light emitting diodes (LEDs) is arranged into at least one row and at least four columns. A direct current power system is joined to the plurality of lights and further comprising a printed circuit board electrically coupled to radio frequency relay switch, and a battery. A wireless remote is communicatively coupled to the radio frequency relay switch. Activating the wireless remote directs the printed circuit board to provide power to the plurality of lights creating the emergency notification.

7 Claims, 19 Drawing Sheets

1

4

- App Will Search for Available WIFI (ESP 32.S)
- Click on the ESP 32.S to connect.
- Once connected it will open a form that is pre-built into the Chip on the Light

8

11

EMERGENCY RESPONSE AND CRIME-REDUCING LIGHTING SYSTEM

CROSS-REFERENCE TO RELATED APPLICATIONS

The present application is a continuation of U.S. patent application Ser. No. 17/721,523 filed Apr. 15, 2022, which is a continuation-in-part of, and claims priority to, U.S. patent application Ser. No. 17/003,763, filed Aug. 26, 2020, which is a non-provisional of U.S. Patent Application No. 62/963,358 filed on Jan. 20, 2020, the disclosures of which are incorporated by reference in their entirety.

FIELD OF THE DISCLOSURE

The present disclosure generally relates to emergency notification systems, and more particularly to integration of emergency notification systems with lighting assemblies.

BACKGROUND

In the past, it was difficult to locate an emergency. This caused a person in emergency to suffer while assistance was delayed. For example, public surveillance cameras cannot alert an emergency response team when an emergency arises. Although digital and voice command services may be available for use in emergencies, this can be an investment of time with constant frequent pauses and limited vocabulary.

SUMMARY

Embodiments of the present disclosure may provide a lighting assembly configured to create an emergency notification. The lighting assembly has a housing with a housing first surface and a housing second surface. A plurality of strobe lights and/or light emitting diodes (LEDs) is arranged at least one row and at least four columns. A direct current power system is joined to the plurality of lights and further comprising a printed circuit board electrically coupled to radio frequency relay switch, and a battery. A wireless remote is communicatively coupled to the radio frequency relay switch. Activating the wireless remote directs the printed circuit board to provide power to the plurality of lights creating the emergency notification.

Embodiments of the present disclosure may provide an application-operated strobe light alert system that may be used in a variety of areas including, but not limited to, residential, business, apartments, and dormitories. The system may be activated by a remote control. The ultra-bright light emitting diode (LED)/strobe light may be mounted to a visible location to help first responders pinpoint the location. The mounting may be temporary or permanent. The mounting may be discrete so that a perpetrator may not know that help is on the way.

Accordingly, the system according to embodiments of the present disclosure may be used for a variety of emergencies including, but not limited to, elderly distress, domestic violence, acts of terrorism, floods and fires, and other situations where traditional communication methods may be difficult and first responder or other help may be needed. This system may provide safety, convenience, comfort, reliability, and time/money savings.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
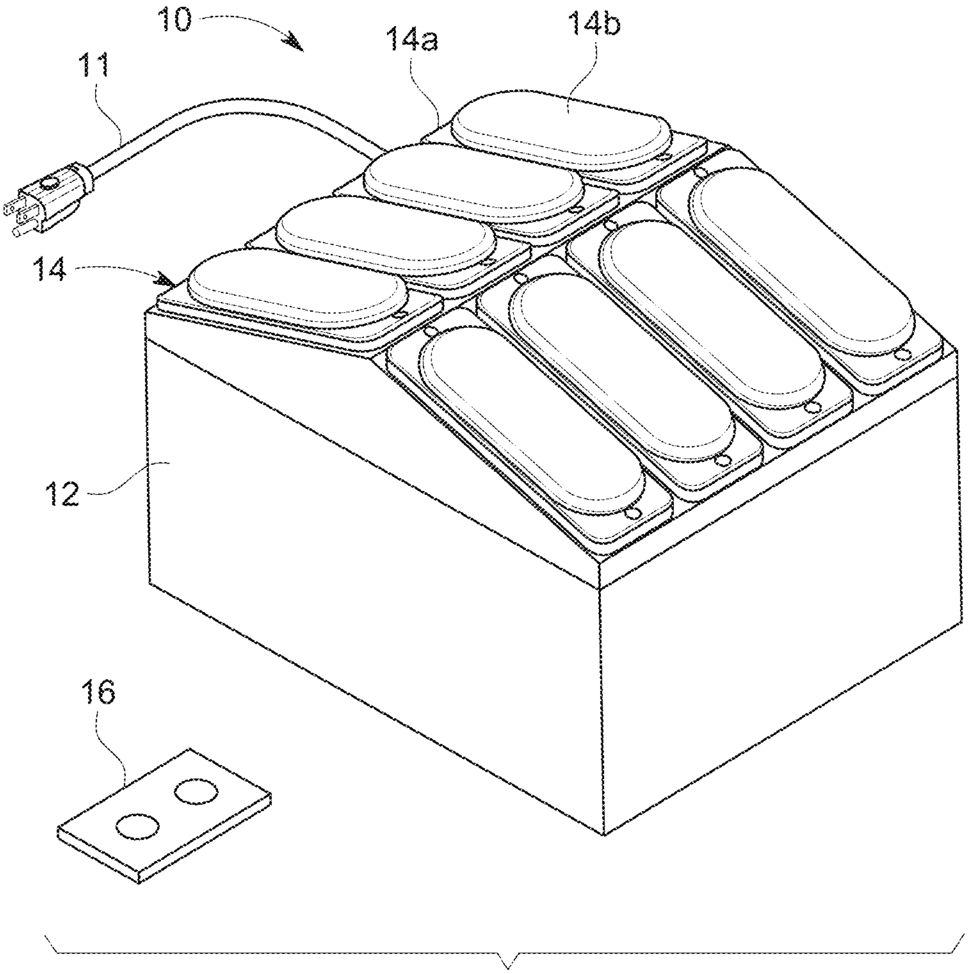
FIG. 1 depicts a perspective view according to an embodiment of the present disclosure.

Embodiments of the present disclosure may provide an emergency response and crime-reducing lighting system that may be configured and operated using a lighting mobile application. As described in more detail herein, a lighting system may include 8 rows of strobe lights and/or light emitting diodes (LEDs) with a plurality of selective modes. In an embodiment of the present disclosure, the lighting system may include 7 selective modes; however, more or fewer selective modes may be provided without departing from the present disclosure. Similarly, while the lighting system is described as including 8 rows of strobe lights, it should be appreciated that more or fewer rows of strobe lights may be included without departing from the present disclosure.

The lighting system may include a curved lens design for weather conditions with a flat body design. The lighting system is designed so water, snow and ice can slide off during certain weather conditions similar to the design of the Minnesota Vikings football stadium. In embodiments of the present disclosure, the lighting system may be battery-powered and/or it may be hard-wired for operation. In an embodiment of the present disclosure, the battery may be able to run for 24 hours, such as if electricity/power were lost at the location for the lighting system. The lighting system according to embodiments of the present disclosure may mount over doorways and/or roofs, such as in areas that may be prone to flooding. The lighting system may be installed outside doors and visible windows so that the lighting may be easily located. It should be appreciated that the lighting system may be mounted at a position high enough over a home or building so that emergency responders may be able to locate emergency situations during floods and harsh weather conditions.

A lighting mobile application may be utilized to control all functionalities of the lighting system in embodiments of the present disclosure. A wireless remote control may be used to operate the lighting system in some embodiments of the present disclosure. The mobile application may communicate with the lighting system to provide notifications to authorities when an emergency situation arises. The lighting system may provide a visual alert to the community when the emergency situation arises.

A chip may be built into a board associated with the lighting system that may connect to a wireless network. The chip may be reset and may be programmable in embodiments of the present disclosure. The lighting system may be controlled and used through the lighting mobile application according to embodiments of the present disclosure.

The lighting system according to embodiments of the present disclosure may provide better and safer means for travel or movement within areas and may provide a powerful and sophisticated portable alert. It should be appreciated that the lighting system according to embodiments of the present disclosure may connect with company and business internal systems, may work in conjunction with neighborhood social media platforms (i.e., NextDoor), may be used by the government, and/or others. The lighting system may be employed in higher crime areas. It also may be used in connection with homes, apartments, businesses, schools, classrooms, universities, senior living facilities, dorms, hotels, motels, inns, movie theaters, factories, workout facilities, restaurants, cruise ships, vehicles, rideshare or transportation network companies, among others. It may be accessed through cell phones, smart watches, and the like. In terms of use with rideshare companies, this may provide better and safer means of travel, impact travel behavior, and may provide a portable alert.

By way of example, and referring to FIG. 1, one embodiment of lighting system 10 may comprise housing 12 joined to power supply 11. Housing 12 may be joined to lighting assembly 14.

Figure 2A:
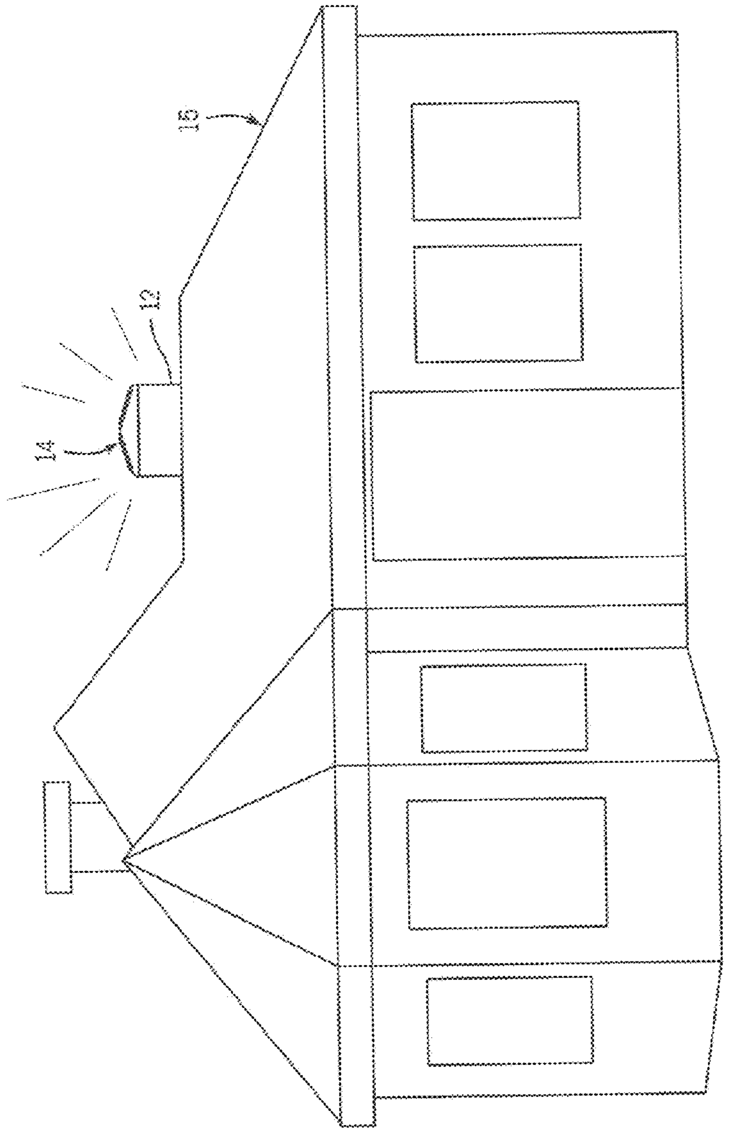
FIGS. 2A-2B show use-based perspective views according to an embodiment of the present disclosure.
Figure 2B:
Figure 3:
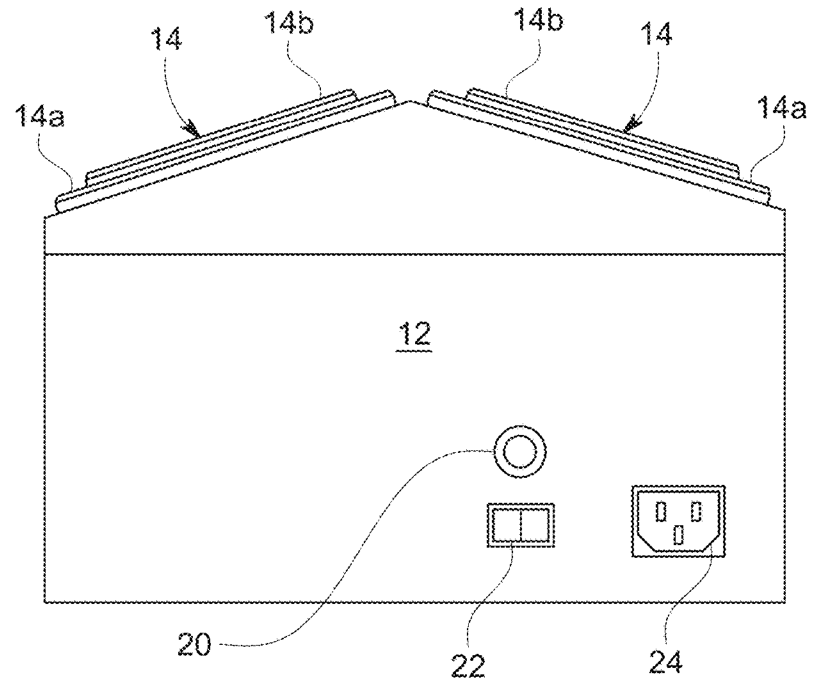
FIG. 3 shows a side elevation view according to an embodiment of the present disclosure.

Lighting assembly 14 may further comprise a plurality of strobe lights 14*a*. Each strobe light 14*a* may be covered by lens 14*b*. FIG. 1 illustrates a bank of eight strobe lights 14*a* arranged into two rows and four columns. The columns are approximately parallel, but the rows are not, meeting at an angle somewhat like a roof on top of housing 12. The pitched upper surface is critical in order to prevent dirt or precipitation from collecting on the plurality of strobe lights 14*a*. This can be shown in FIG. 2A where housing 10 is installed onto roof 15. FIG. 2B depicts a house where the lighting system has been installed above the windows on the side of the house.

A first side of housing 12 may further comprise strobe/light mode selector 20, on/off switch 22, and power receptacle 24. Power receptacle 24 may be electrically coupled to power supply 11.

Figure 7A:
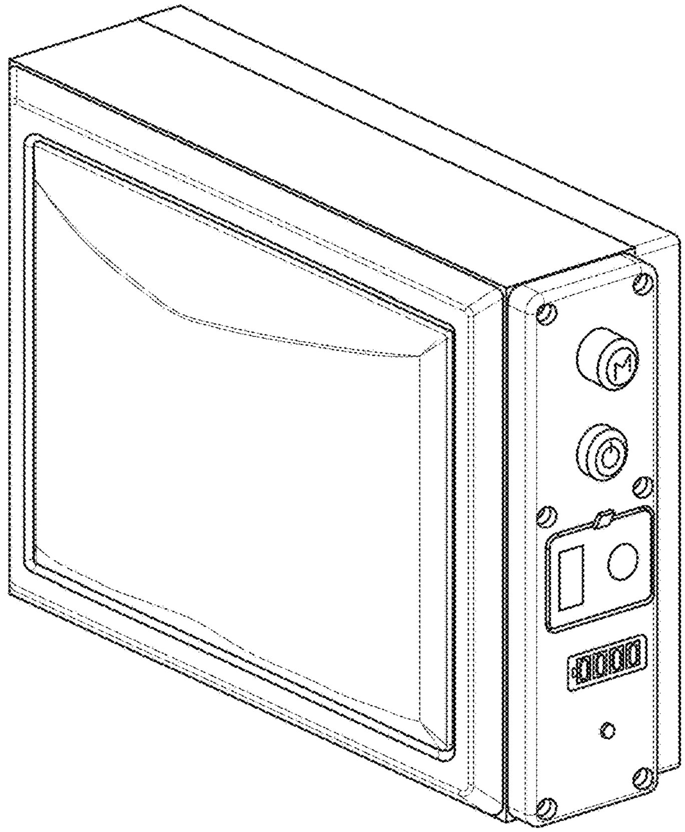
FIGS. 7A-7D depict views of a lighting system according to an embodiment of the present disclosure.
Figure 7B:
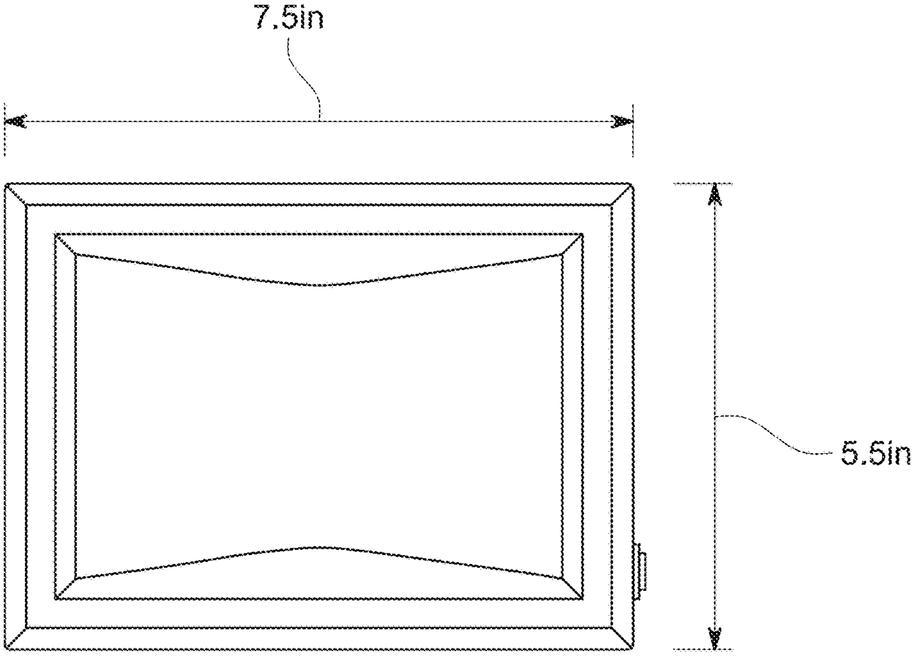
Figure 7C:
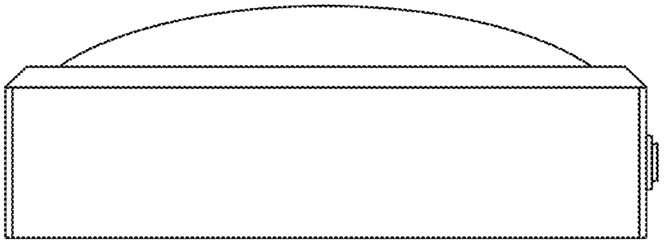
Figure 7D:
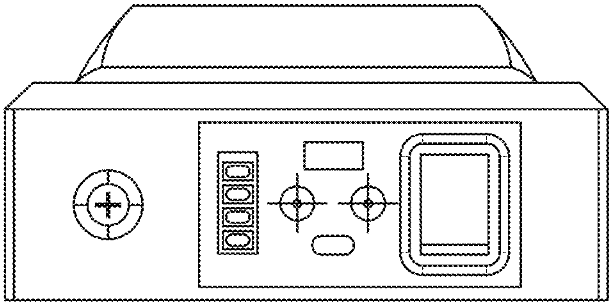

FIGS. 7A-7D depict views of a lighting system according to an embodiment of the present disclosure. More specifically, FIG. 7A depicts a perspective view of the lighting system, FIG. 7B depicts a front view of the lighting system, FIG. 7C depicts a side view of the lighting system, and FIG. 7D depicts a top view of the lighting system. As depicted in FIG. 7A, the lighting system may include a USB port, and the lighting system may include a curved lens as previously described.

Figure 4:
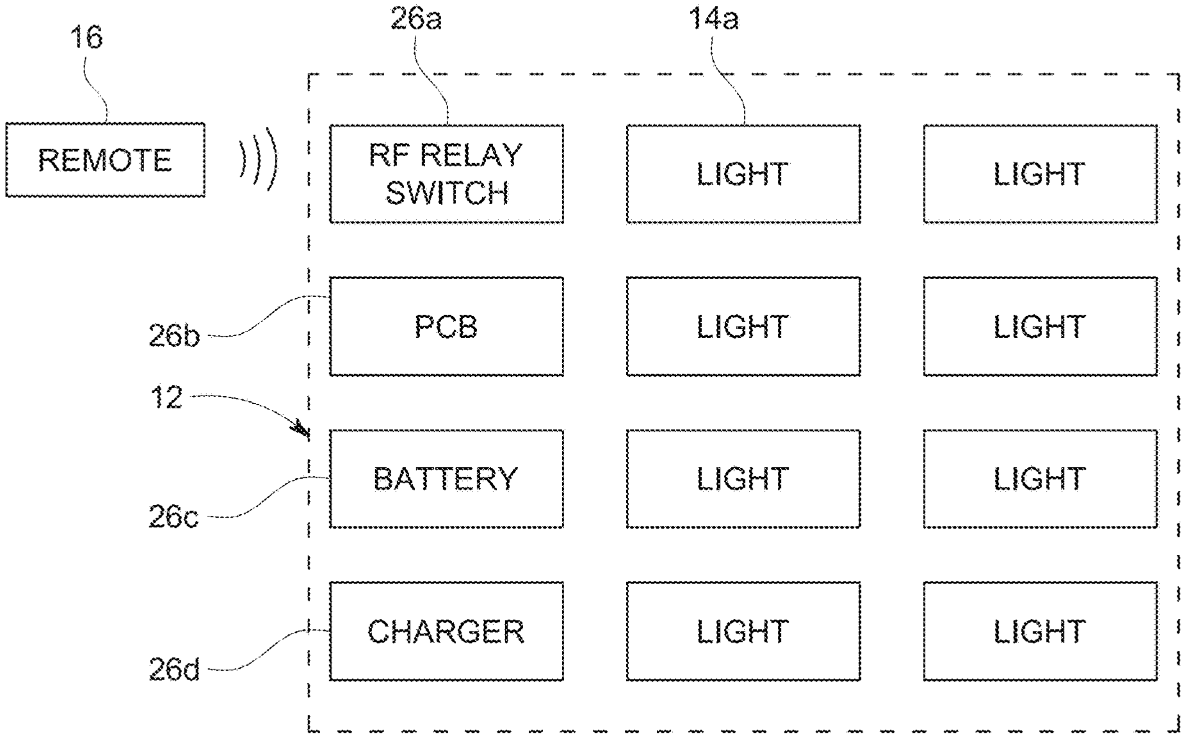
FIG. 4 shows a block diagram according to an embodiment of the present disclosure.

Lighting system 10 may further comprise a direct current power system shown in FIG. 4. Radio frequency relay switch 26*a* may be electrically coupled to printed circuit board 26*b*. Printed circuit board 26*b* may be electrically coupled to battery 26*c* and a plurality of strobe lights 14*a*. Charger 26*d* may be electrically coupled to battery 26*c* and power receptacle 24. Printed circuit board 26*b* may be electrically coupled to strobe mode selector 20 and on/off switch 22.

To use the device, a user can engage wireless remote 16 to send a signal to radio frequency relay switch 26*a*. Radio frequency relay switch 26*a* may engage printed circuit board 26*b* to direct power from battery 26*c* to the plurality of strobe lights 14*a*. However, it should be appreciated that power may be directed through a hardwired configuration in some embodiments of the present disclosure. This may activate the plurality of strobe lights 14*a* in a strobe light pattern.

Figure 5:
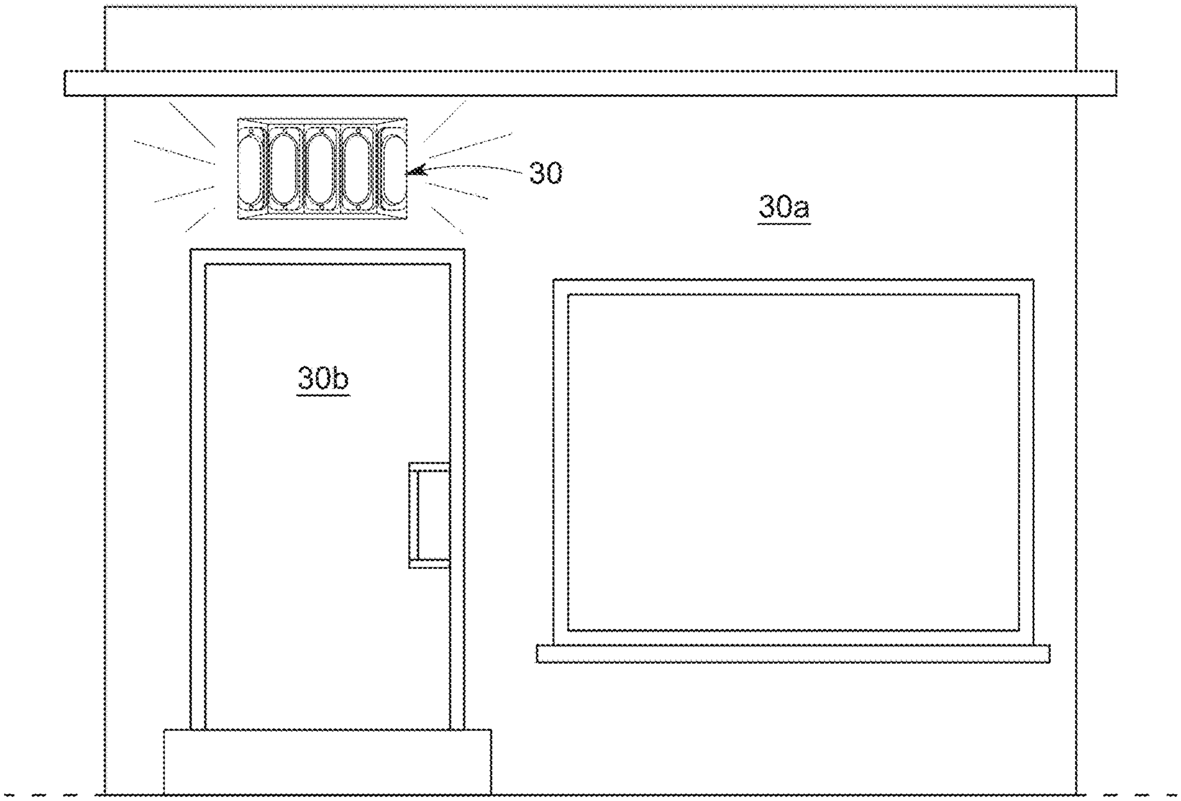
FIG. 5 shows a use-based perspective view according to an embodiment of the present disclosure.

Turning to FIG. 5, housing 30 may be installed onto wall 30*a* above door 30*b*. Housing 30 may have one row with five columns of strobe lights as opposed to housing 10 which has more rows and fewer columns. It should be appreciated that more or fewer rows or columns may be utilized without departing from the present disclosure.

Figure 6A:
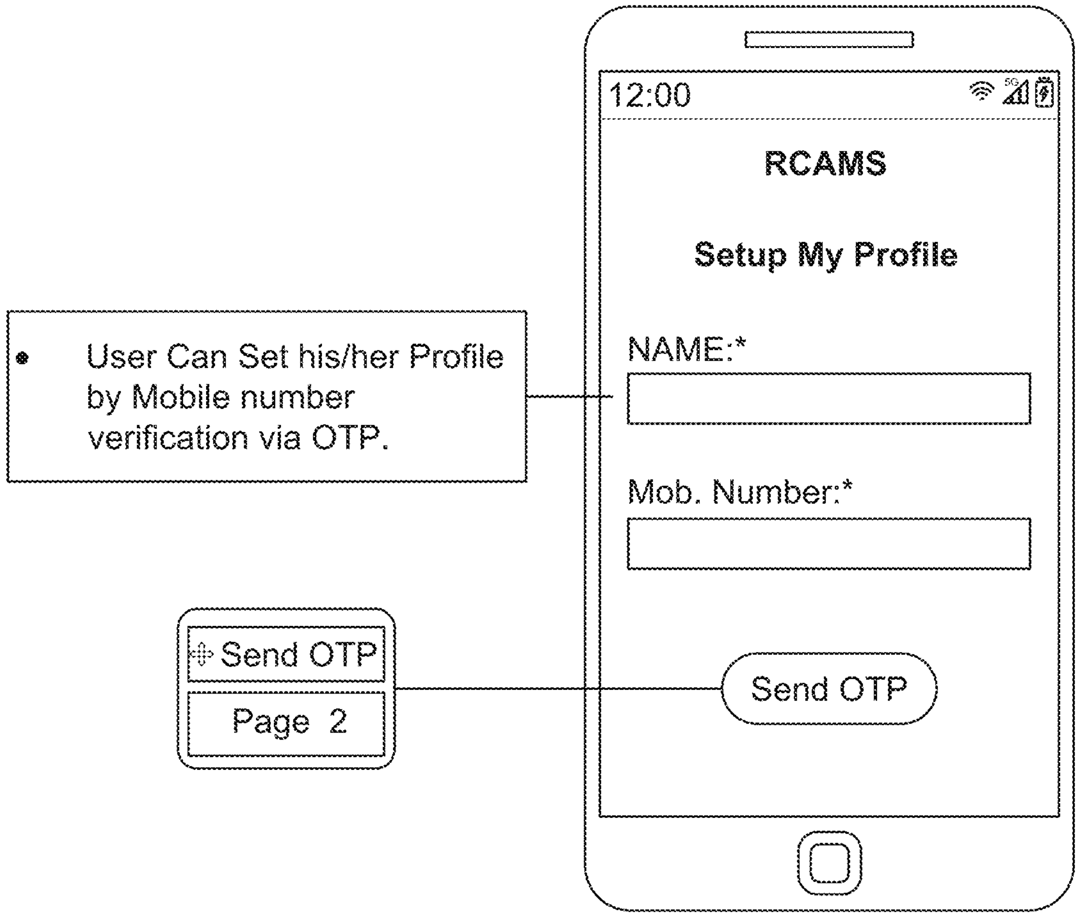
FIGS. 6A-6L depict screenshots for a lighting mobile application according to an embodiment of the present disclosure.
Figure 6B:
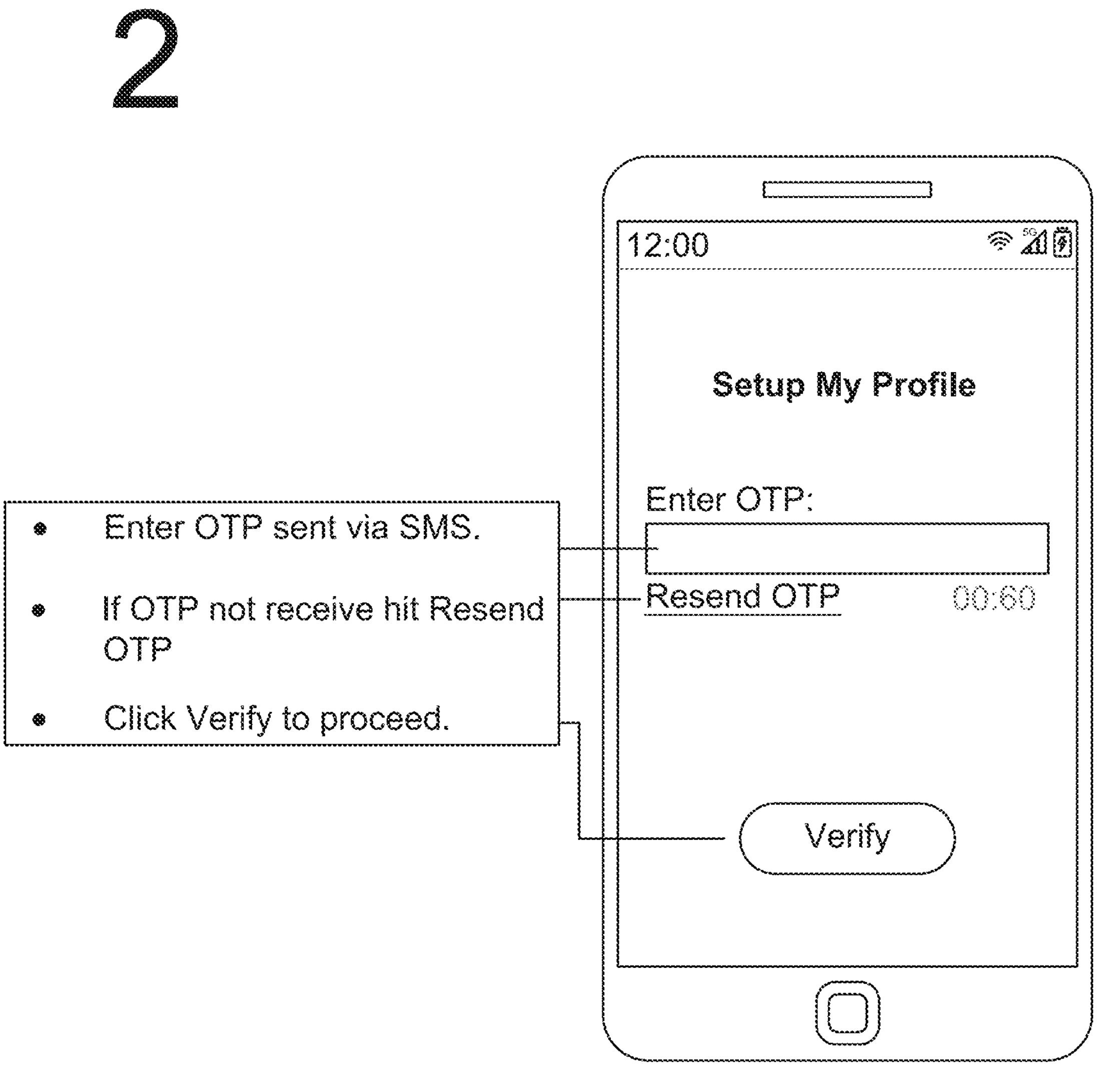

FIGS. 6A-6L depict screenshots for a lighting mobile application according to an embodiment of the present disclosure. A user may set up a profile within a lighting mobile application by entering his/name and mobile telephone number (FIG. 6A); however, it should be appreciated that a user may be prompted to enter additional information without departing from the present disclosure. After entering the information to create a profile, a user may be prompted to request a one-time password (OTP) to be sent to the user, such as by selecting the input depicted on FIG. 6A. In FIG. 6B, the user may enter the OTP that may be sent to the user through SMS, email, or other delivery mechanism. If the user does not receive the OTP, the user may request the OTP be re-sent. Upon entering the OTP, the user may select the input to verify the OTP, such as depicted in FIG. 6B. The user may be given a limited amount of time to enter the OTP and verify it before having to request another OTP in an embodiment of the present disclosure.

Figure 6C:
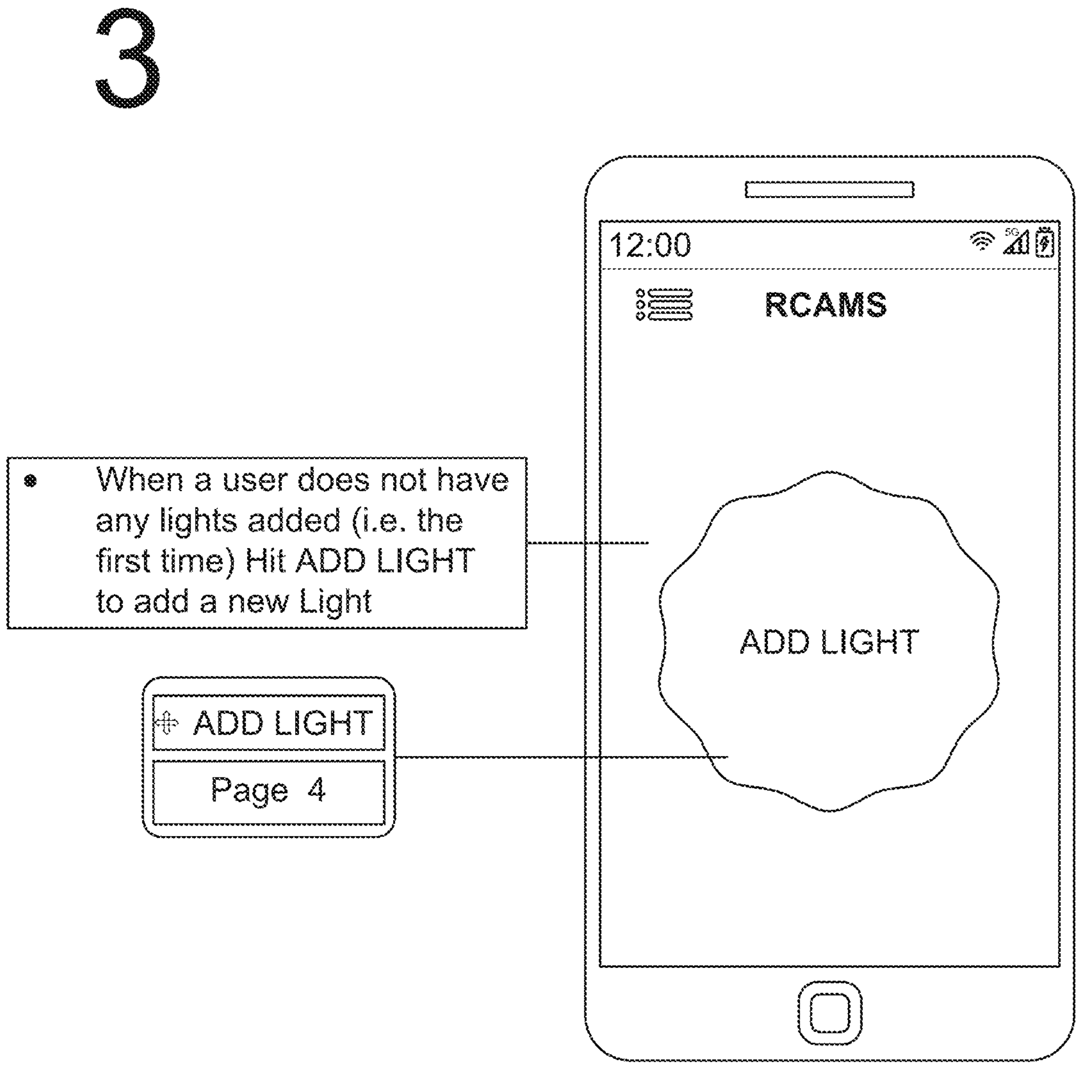

FIG. 6C depicts how a user may add one or more lights. This screen shot depicted in FIG. 6C reflects when a user has not yet set up any lights. The user may select the input labeled "add light" to add a new light. However, it should be appreciated that the input may be depicted in another manner for selection without departing from the present disclosure.

Figure 6D:
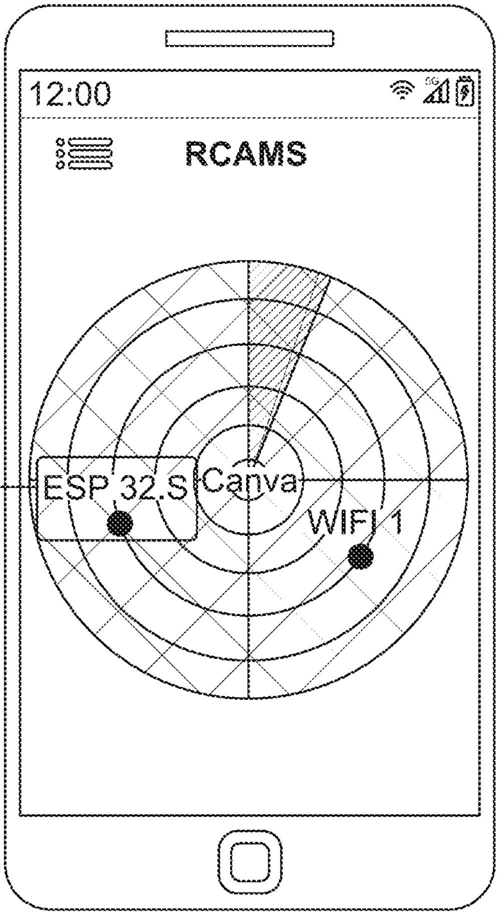
Figure 6E:
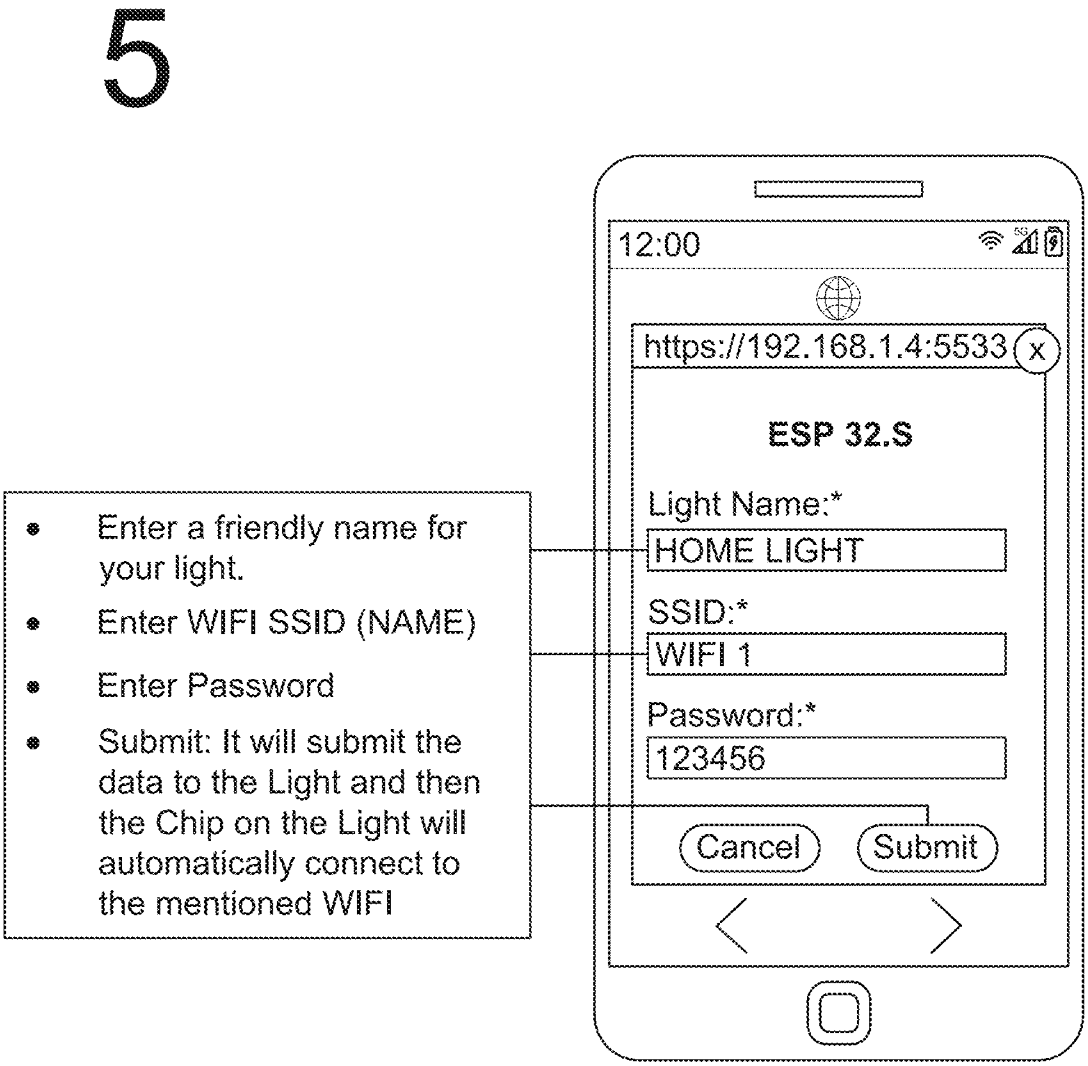

In FIG. 6D, the lighting mobile application may search for an available wireless signal. As depicted in FIG. 6D, ESP 32. S is a light associated with an available Wi-Fi network that the user may select to connect. Once connected to the selected Wi-Fi network and a light is identified (ESP 32.S), a form may be opened that is pre-built into a chip that may be associated with a light (FIG. 6E). This form may prompt the user to enter a friendly name to associate with the light, the Wi-Fi network associated with the light, and a password associated with operation of the light. While certain pieces of information are included on the form in FIG. 6E, it should be appreciated that more or fewer items of information may be included without departing from the present disclosure. Regardless, once the form has been completed, the user may select the "submit" input which will submit data to the light. The chip present on the light then may automatically connect to the Wi-Fi network specified in the form in FIG. 6E.

Figure 6F:
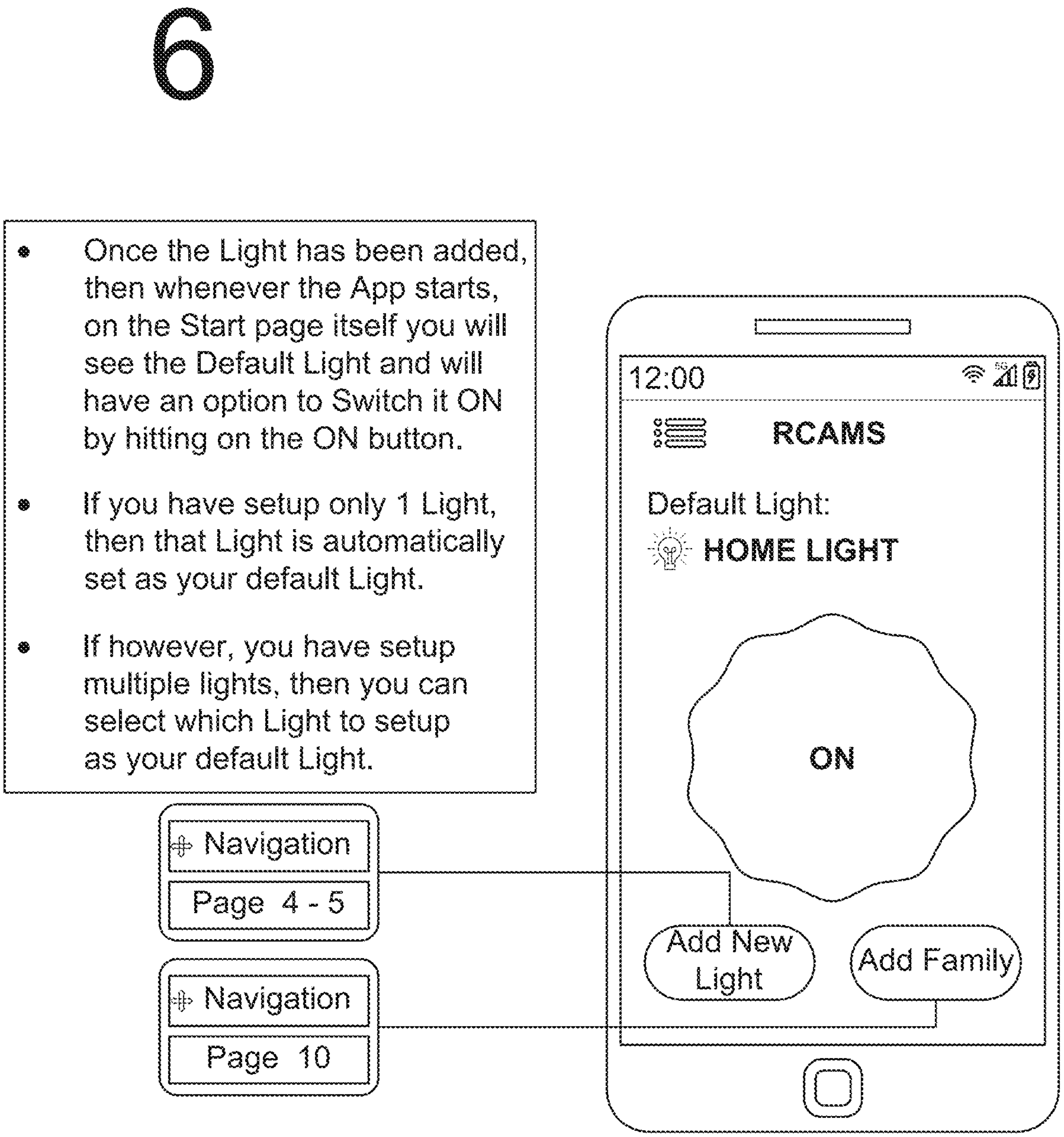

As depicted in FIG. 6F, once the light has been activated, such as through the form in FIG. 6E, whenever the lighting mobile application is opened/activated, the start page of the application may identify a default light, such as in FIG. 6F. The user may be presented with an option to turn on the default light by selecting the "on" input. If the user has only set up one light, that light may be automatically set as the user's default light. However, if the user has set up more than one light, the user may select which light to establish as the user's default light. The screen shot of the start page (FIG. 6F) also reflects an input for the user to add a new light, such as through the mechanism described with respect to FIGS. 6D-6E. The start page also may identify how a user may add family, as will be described in further detail below.

Figure 6G:
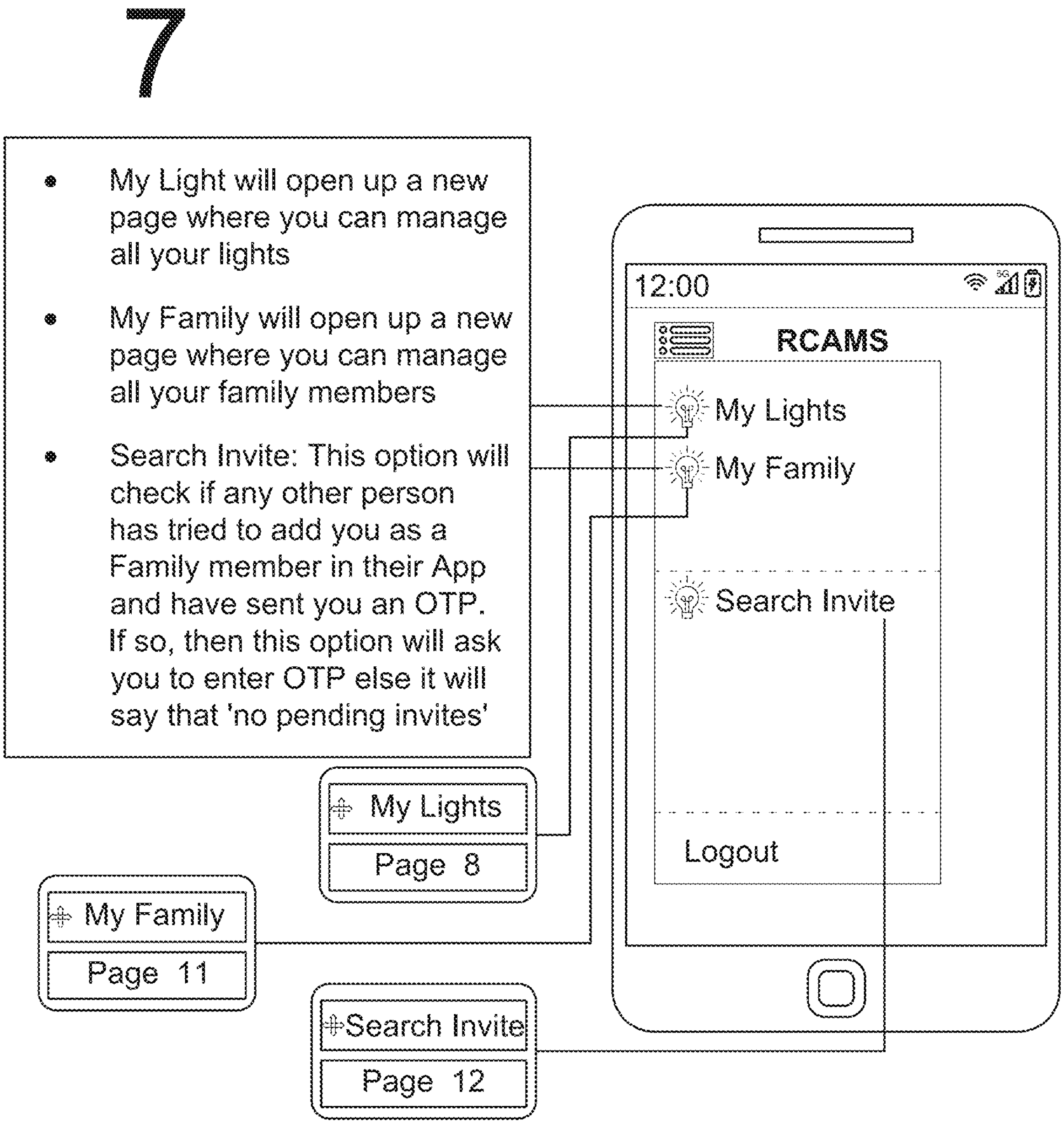

FIG. 6G depicts an inside menu according to an embodiment of the present disclosure. Selection of "My Lights" may open a new page within the lighting mobile application where the user may manage all of the user's lights, which will be described in more detail with respect to FIG. 6H.

Figure 6H:
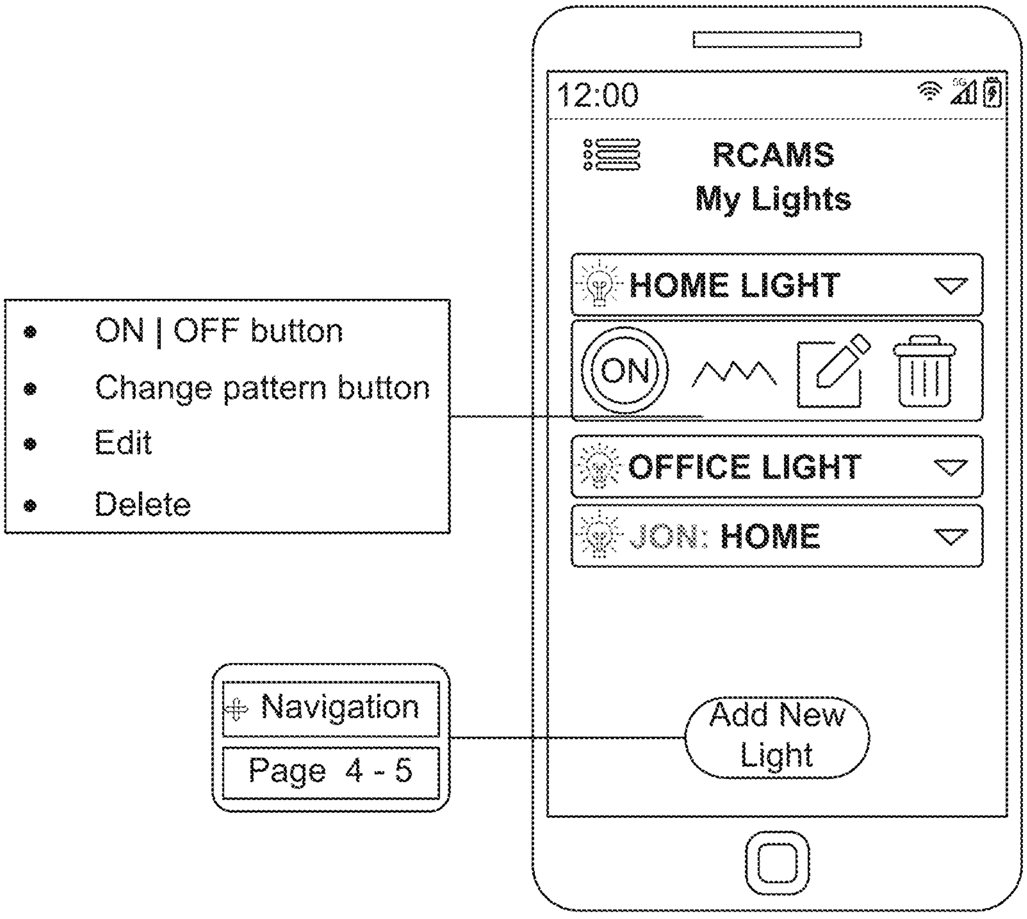
Figure 6I:
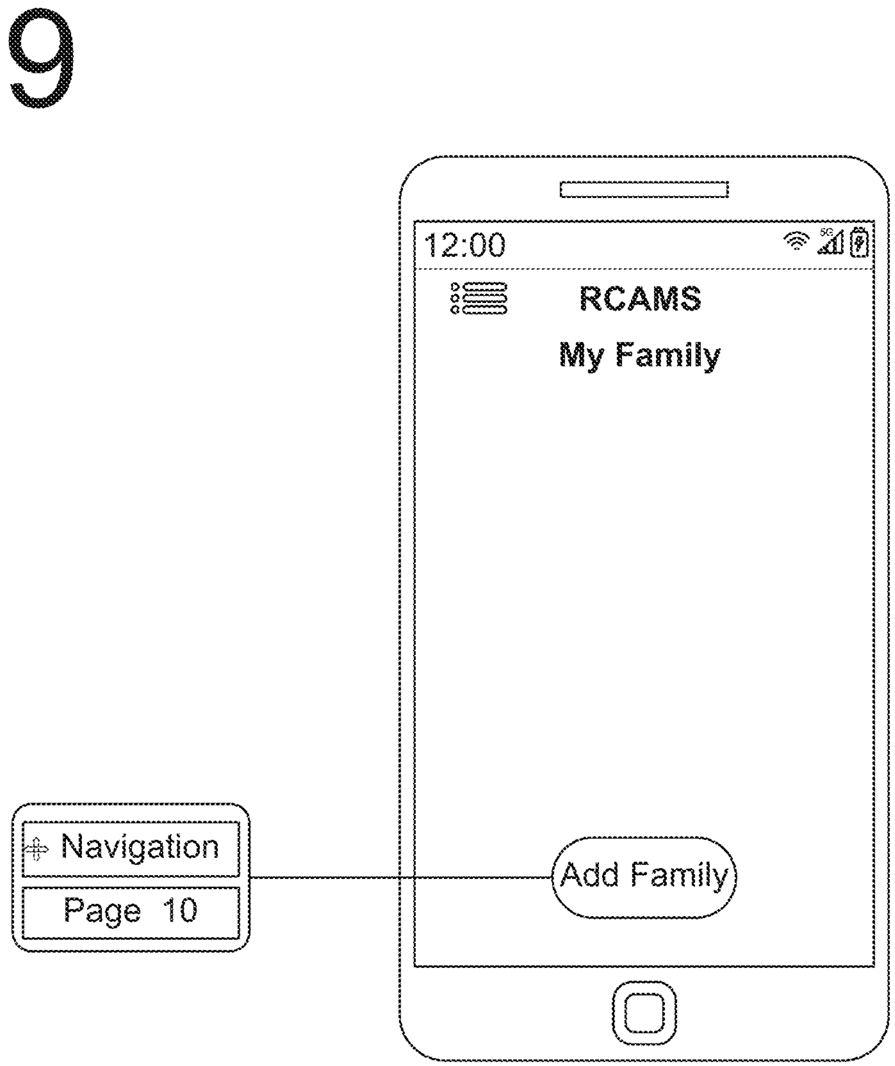
Figure 6J:
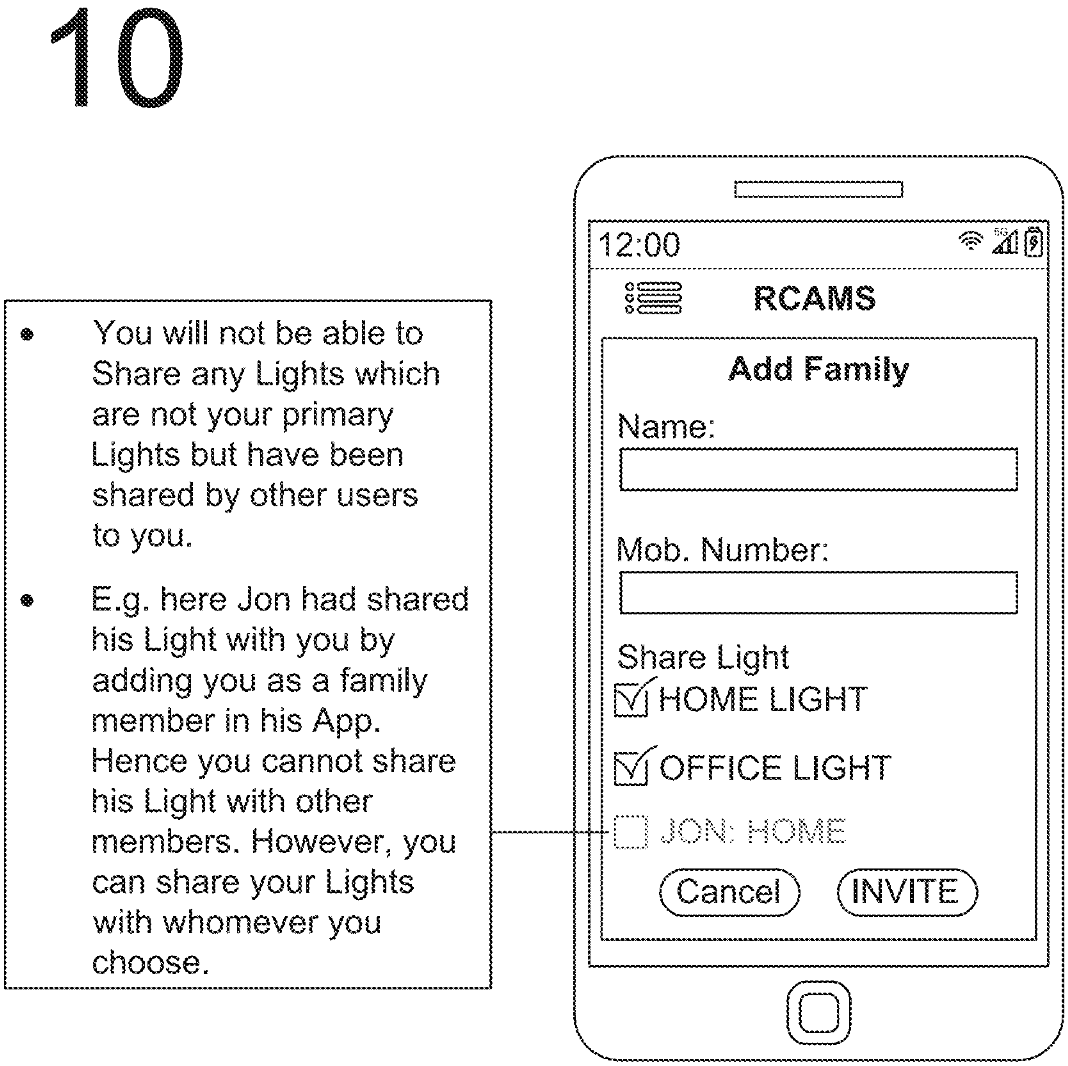
Figure 6K:
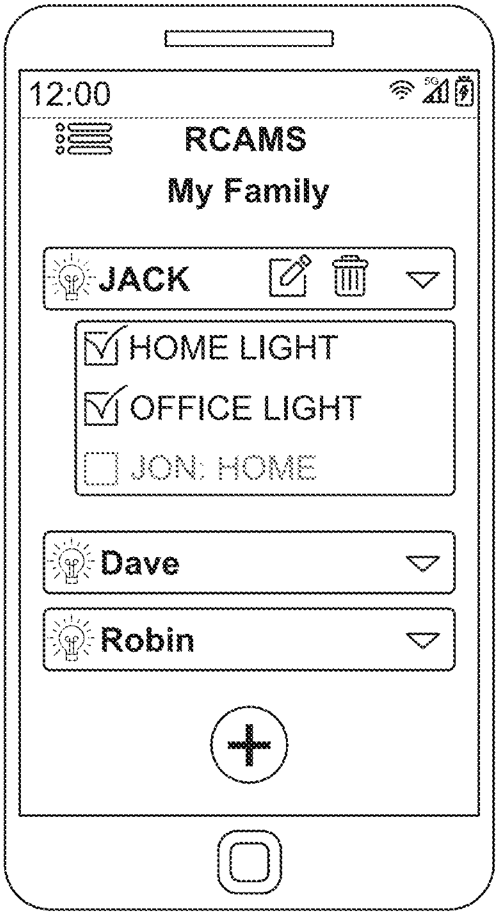

Selection of "My Family" may open a new page where the user can manage all of the user's family members, as described in more detail with respect to FIG. 6K. Selection of "Search Invite" may check to see if any other person has tried to add the user as a family member in that person's lighting mobile application and sent the user an OTP. If so, this option may prompt the user to enter the OTP that has been provided. Otherwise, selection of "Search Invite" will confirm that the user has no pending invites. This function is described in more detail with respect to FIG. 6L.

FIG. 6H depicts a screen shot of a "My Lights" screen within a lighting mobile application according to an embodiment of the present disclosure. As previously described, the user may manage his/her lights within the application using this screen. FIG. 6H depicts an example of "Home Light" and features that may be accessed related to this particular light. More specifically, the features may include, but are not limited to, an on/off button, a change pattern button, an edit function, and a delete function. It should be appreciated that more or fewer features may be provided for each individual light without departing from the present disclosure. Again, a user may select the "add new light" input to add additional lights to the user's profile in embodiments of the present disclosure.

FIG. 6I depicts a screen shot of a "My Family" screen within a lighting mobile application according to an embodiment of the present disclosure. As depicted herein, the user may initially not have any family identified, such as on FIG. 6I. The user may select the "add family" input to begin the process to add family members.

FIG. 6J depicts a screen shot of how to add family according to an embodiment of the present disclosure. To add a person, the person's name and mobile phone number may be added, and the user may identify which lights to be shared. It should be appreciated that the user may not be permitted to share any lights that are not the user's primary lights but have been shared with the user by other users. As depicted in FIG. 6J, Jon shared his light with the user by adding the user as a family member in his lighting mobile application. The user will not be permitted to share Jon's light with other members. However, the user may share the Home Light or Office Light, which are the user's lights, with whomever the user chooses. While the phrase "family member" or the term "family" are used, it should be appreciated that the user may add people who are not technically family members without departing from the present disclosure.

FIG. 6K depicts a screen shot of a "My Family" screen within a lighting mobile application according to an embodiment of the present disclosure. As depicted herein, the screen displays three family members. Selection of a family member presents the user with the options to edit or delete the family member. The selection also identifies what lights have been shared with the family member. The user may use the "plus" sign to add other family members in an embodiment of the present disclosure.

Figure 6L:
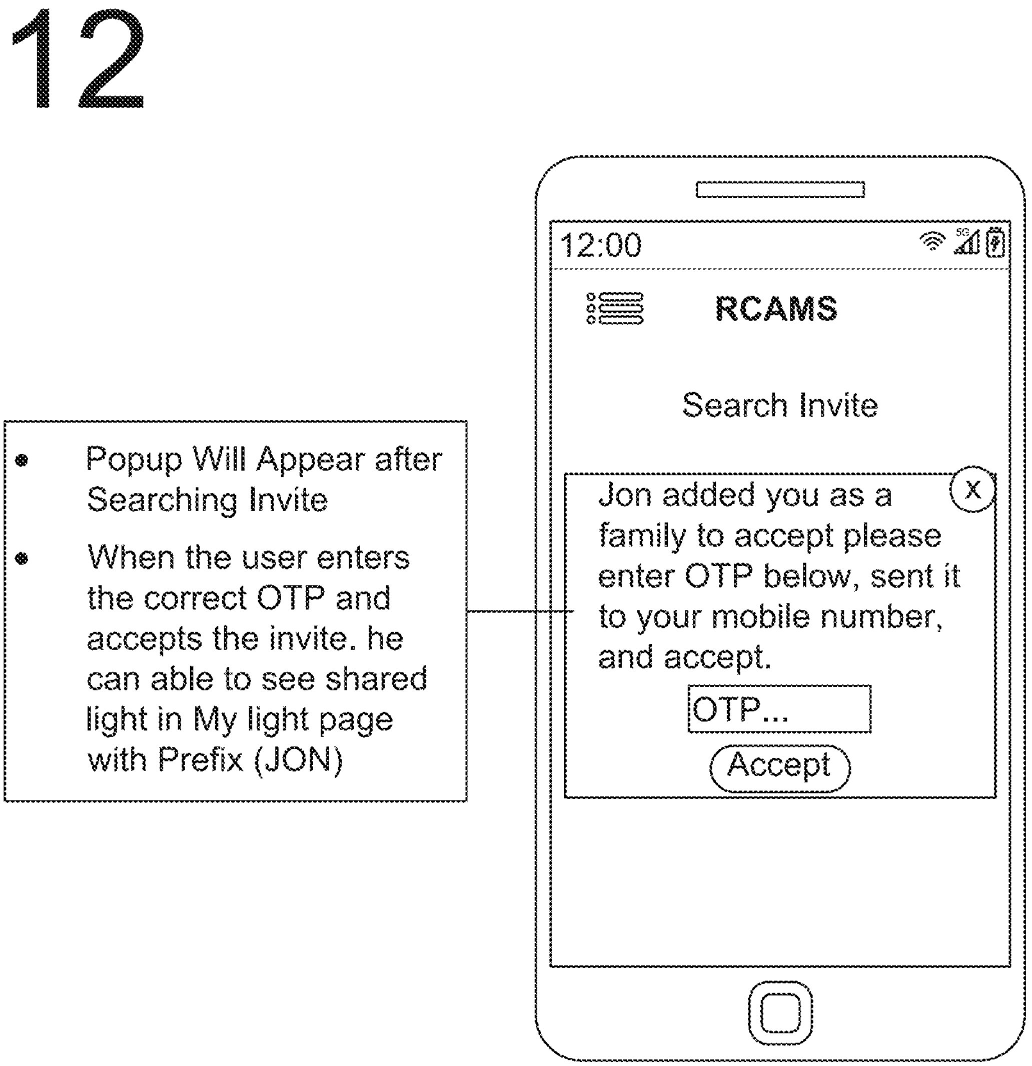

FIG. 6L depicts a screen shot of a "Search Invite" screen within a lighting mobile application according to an embodiment of the present disclosure. As depicted herein, a pop-up may be displayed after the user has selected "Search Invite" as previously described. This pop-up reflects that another person has added the user as a family member. To accept the invite, the user may be prompted to enter the OTP that has been provided to the user. When the user enters the correct OTP and accepts the invite, the user may be able to see any shared lights on the user's "My Light" screen. The shared light may be identified by the name of the person who shared the light (i.e., JON). However, other means for identifying shared lights may be utilized without departing from the present disclosure.

As described herein, the lighting mobile application may connect to a message broker and send the necessary data to connect. The broker can turn the light on and off, change the lighting pattern, and/or evaluate battery life. The application may control all the functionalities of the lighting system along with a wireless remote. Accordingly, no emergency number may be needed, and no trained staff may be required. This system may provide quick and easy location acquisition reducing response time for emergencies. It also may operate during power outages using battery power, but it also may directly connect to the electrical system. The lighting system/application can integrate into existing safety systems or can operate as a standalone system. It also may be programmed to send push notifications or other communications when safety issues arise.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An application-operated light alert system configured to create an emergency notification, the system comprising:
- a lighting assembly comprising:
  - a housing having a first surface and a second surface; and
  - a plurality of light emitting diodes (LEDs) arranged into at least two rows and at least four columns, wherein the at least four columns are approximately parallel and the at least two rows meet at an angle for water, snow, and ice to slide off the plurality of LEDS;
- a lighting mobile application configured to set up and control operation of the lighting assembly; and
- a wireless remote communicatively coupled to a radio frequency relay switch to send a signal to the radio frequency relay switch which directs power to the plurality of LEDs creating the emergency notification.

2. The system of claim 1 further comprising:
- a curved lens arranged over each of the plurality of strobe lights.

3. The system of claim 1 further comprising:
- a light mode selector, an on/off switch, and a power receptacle, wherein each of the light mode selector, the on/off switch, and the power receptacle are positioned on the first surface of the housing and are mechanically coupled to the housing.

4. The system of claim 3 further comprising:
- a charger electrically coupled to a battery and the power receptacle.

5. The system of claim 1, wherein the lighting assembly is installed on a roof.

6. An application-operated light alert system configured to create an emergency notification, the system comprising:

a lighting assembly comprising:

a housing having a first surface and a second surface; and a plurality of light emitting diodes (LEDs) arranged into at least two rows and at least four columns, wherein the at least four columns are approximately parallel and the at least two rows meet at an angle for water, snow, and ice to slide off the plurality of LEDs;

a lighting mobile application configured to set up and control operation of the lighting assembly; and a wireless remote communicatively coupled to a radio frequency relay switch to send a signal to the radio frequency relay switch which directs power to the plurality of LEDs creating the emergency notification, wherein the lighting assembly is installed over a door or a window of a structure.

7. An application-operated light alert system configured to create an emergency notification, the system comprising:

a lighting assembly comprising:

a housing having a first surface and a second surface; and a plurality of light emitting diodes (LEDs) arranged into at least two rows and at least four columns, wherein the at least four columns are approximately parallel and the at least two rows meet at an angle for water, snow, and ice to slide off the plurality of LEDs;

a lighting mobile application configured to set up and control operation of the lighting assembly; and a wireless remote communicatively coupled to a radio frequency relay switch to send a signal to the radio frequency relay switch which directs power to the plurality of LEDs creating the emergency notification, wherein the lighting assembly is installed on a vehicle.

* * * * *